United States Patent
Baskin et al.

(10) Patent No.: US 11,891,167 B2
(45) Date of Patent: Feb. 6, 2024

(54) TEETER FLAP LOCK

(71) Applicant: Bell Textron Inc., Fort Worth, TX (US)

(72) Inventors: Bryan Kenneth Baskin, Arlington, TX (US); Kyle Thomas Cravener, Arlington, TX (US); Andrew Ryan Maresh, Colleyville, TX (US)

(73) Assignee: Textron Innovations Inc., Providence, RI (US)

( * ) Notice: Subject to any disclaimer, the term of this patent is extended or adjusted under 35 U.S.C. 154(b) by 166 days.

(21) Appl. No.: 17/503,736

(22) Filed: Oct. 18, 2021

(65) Prior Publication Data

US 2023/0118750 A1 Apr. 20, 2023

(51) Int. Cl.
*B64C 27/32* (2006.01)
*B64C 29/00* (2006.01)

(52) U.S. Cl.
CPC ........ *B64C 27/322* (2013.01); *B64C 29/0033* (2013.01)

(58) Field of Classification Search
CPC ....... B64C 27/322; B64C 27/37; B64C 27/41; B64C 27/43; B64C 29/0033
See application file for complete search history.

(56) References Cited

U.S. PATENT DOCUMENTS

| | | | | |
|---|---|---|---|---|
| 5,588,801 | A | * | 12/1996 | Commelin ............ B64C 27/322 416/53 |
| 2019/0047691 | A1 | * | 2/2019 | Schank ............... B64C 29/0033 |
| 2022/0388649 | A1 | * | 12/2022 | Bower .................. B64C 23/069 |

* cited by examiner

*Primary Examiner* — Tien Q Dinh
*Assistant Examiner* — William L Gmoser
(74) *Attorney, Agent, or Firm* — Fogarty LLP

(57) ABSTRACT

A teeter flap lock for an aircraft may include at least one pair of diametrically positioned teeter flap lock plates extending from a rotor teetering hinge, spaced apart from a rotor mast of the aircraft. A teeter flap lock block is positioned about the rotor mast and is configured to fit between the teeter flap lock plates and the rotor mast. The teeter flap lock block fits between and contacts the teeter flap lock plates in an engaged position, and is movable between the engaged position and a disengaged position relative to the teeter flap lock plates. The teeter flap lock enables flapping of rotors coupled to the rotor mast via the teetering hinge when the teeter flap lock block is in the disengaged position and disables flapping of the rotors when the teeter flap lock block is in the engaged position.

20 Claims, 9 Drawing Sheets

TEETER FLAP LOCK

TECHNICAL FIELD

The present disclosure relates generally to aircraft, more particularly to vertical takeoff and landing (VTOL) aircraft, and specifically to a teeter flap lock for VTOL aircraft.

BACKGROUND

Fixed-wing aircraft, such as airplanes, are capable of flight using wings that generate lift responsive to the forward airspeed of the aircraft, which is generated by thrust from one or more jet engines or propellers. The wings generally have an airfoil cross section that, in forward flight, produces low pressure on the upper surface and high pressure on the lower surface to generate the lift force to support the aircraft in flight. Fixed-wing aircraft, however, typically require a runway that is hundreds or thousands of feet long for takeoff and landing.

Unlike fixed-wing aircraft, vertical takeoff and landing (VTOL) aircraft do not require runways. Vertical takeoff and landing (VTOL) aircraft are capable of taking off, hovering, and landing vertically. Examples of VTOL aircraft include helicopters and tiltrotor aircraft, which have one or more rotors that provide lift and thrust to the aircraft. The rotors not only enable hovering and vertical takeoff and landing, but also enable forward, backward and lateral flight.

Tiltrotor aircraft typically have two or more proprotors mounted near the outboard ends of a fixed wing. The proprotors are rotatable relative to the fixed wing such that the proprotors have a generally horizontal plane of rotation providing vertical thrust for takeoff, hovering and landing, much like a conventional helicopter, and a generally vertical plane of rotation providing forward thrust for cruising in forward flight with the fixed wing providing lift, much like a conventional propeller driven airplane.

Electric vertical takeoff and landing (eVTOL) aircraft may use electric power to hover, take off, and land vertically and eVTOL aircraft may use electric propulsion (motors, batteries, electronic controllers). EVTOL aircraft may utilize electricity exclusively, or in conjunction with liquid fuel, to power the various systems of the aircraft including the propulsion system. EVTOL aircraft may fill rolls such as urban air mobility (air taxi), delivery, and the like. Some eVTOL platforms may be hybrid-electric, so as to provide extended reach to travel farther or to more remote locations.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The present invention is directed to systems and methods for an aircraft, such as a tiltrotor aircraft, having a fuselage, a wing coupled to the fuselage, and a vertical lift propulsion assembly coupled to the fuselage and/or a wing coupled to the fuselage. This propulsion assembly may include a vertical lift rotor mast and a rotor teetering hinge coupled to the rotor mast and a pair of rotor blades, the rotor teetering hinge having a rotor teetering degree of freedom relative to the rotor mast. A teeter flap lock may include at least one pair of diametrically positioned teeter flap lock plates extending from the rotor teetering hinge, spaced apart from a rotor mast of the aircraft. A teeter flap lock block may be positioned about the rotor mast and configured to fit between the teeter flap lock plates and the rotor mast. The teeter flap lock block fits between and contacts the teeter flap lock plates in an engaged position, and is movable between the engaged position and a disengaged position relative to the teeter flap lock plates. The teeter flap lock enables flapping of the rotors coupled to the rotor mast via the teetering hinge when the teeter flap lock block is in the disengaged position and disables flapping of the rotors when the teeter flap lock block is in the engaged position.

The teeter flap lock may thus disable flapping of the rotors with the teeter flap lock block in the engaged position when the rotors are stopped and aligned with a fuselage of the tiltrotor aircraft for horizontal flight and the teeter flap lock may enable flapping of the rotors with the teeter flap lock block in the disengaged position when the rotors are providing lift when the tiltrotor aircraft is in vertical takeoff and/or landing modes.

An engagement mechanism linked to the teeter flap lock block may be configured to slide the teeter flap lock block along the rotor mast to engage and disengage the teeter flap lock. The teeter flap lock block may have a plurality of (spring biased) rollers configured to align the teeter flap lock block and the teeter flap lock plates and contact the teeter flap lock plates, when the teeter flap lock block is moved to the engaged position. Also, a protective wear sleeve may be disposed on the rotor mast between the teeter flap lock block and the mast.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

Figure 1:
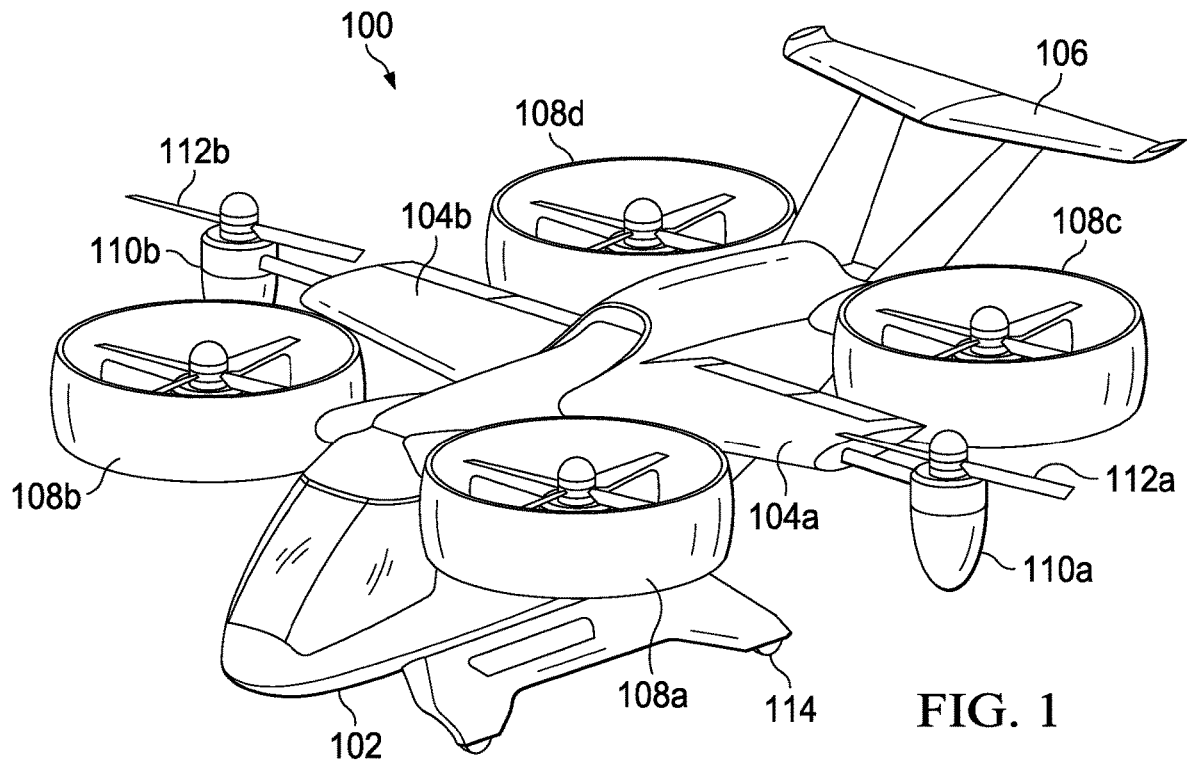
Figure 2:
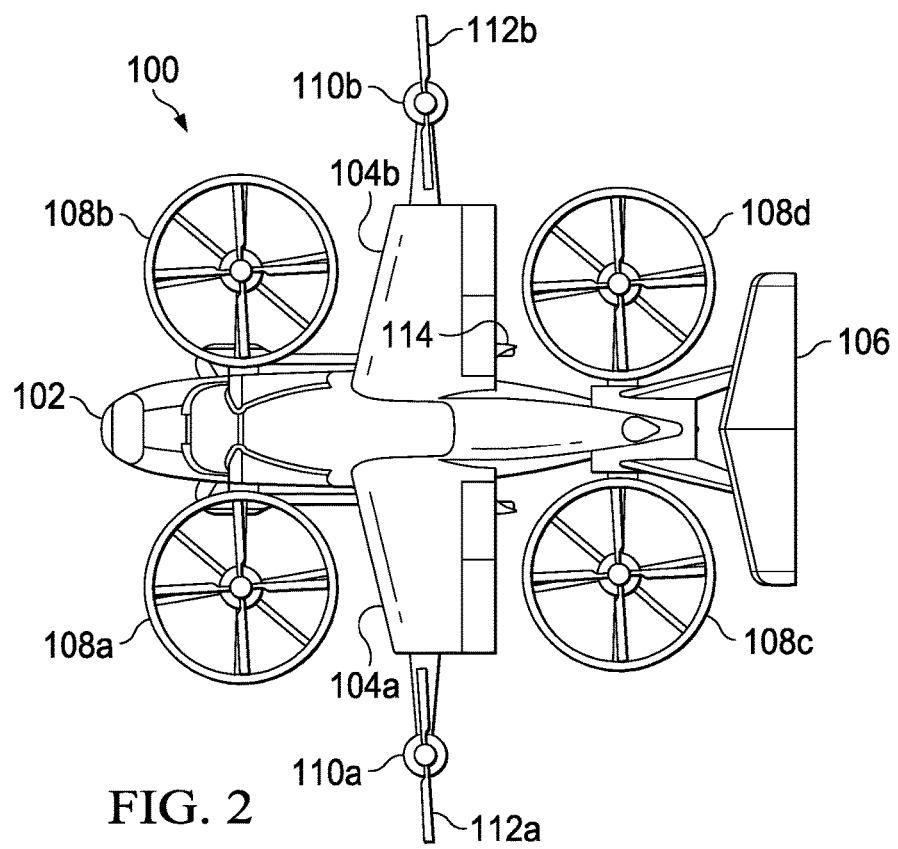
Figure 3:
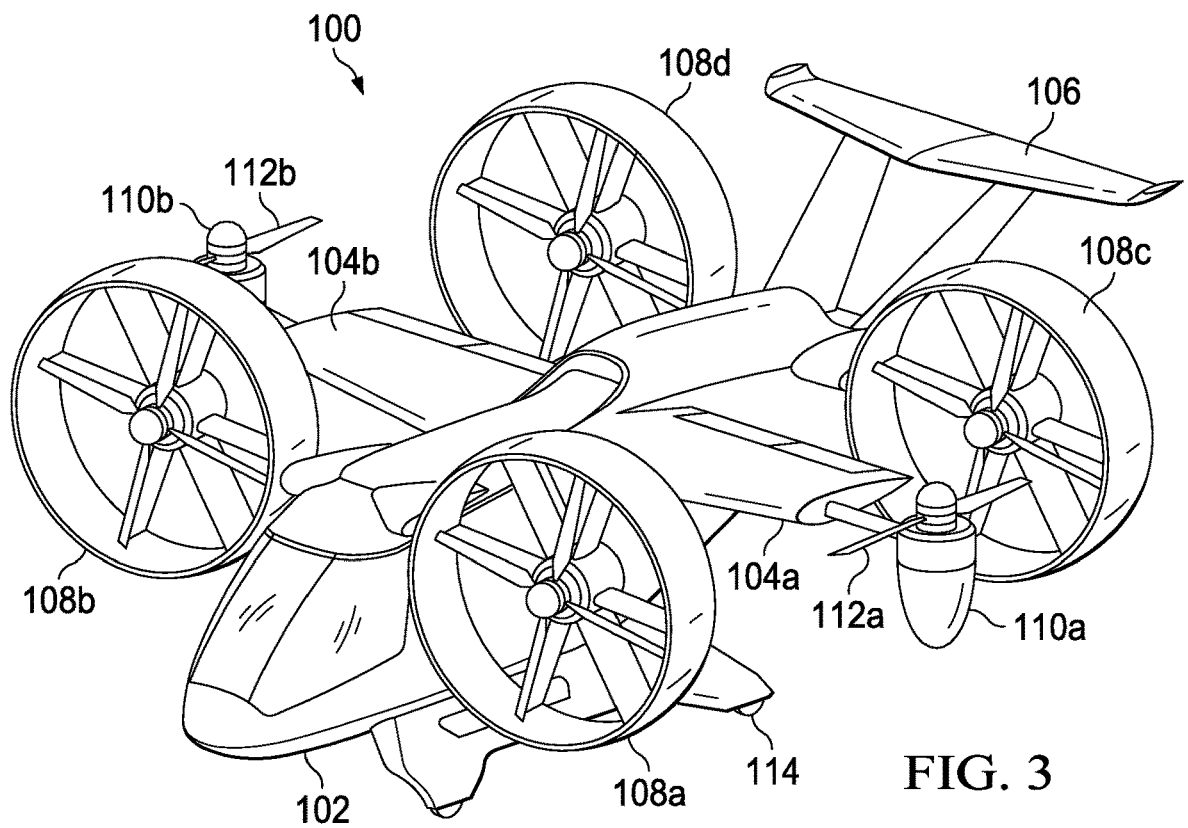
Figure 4:
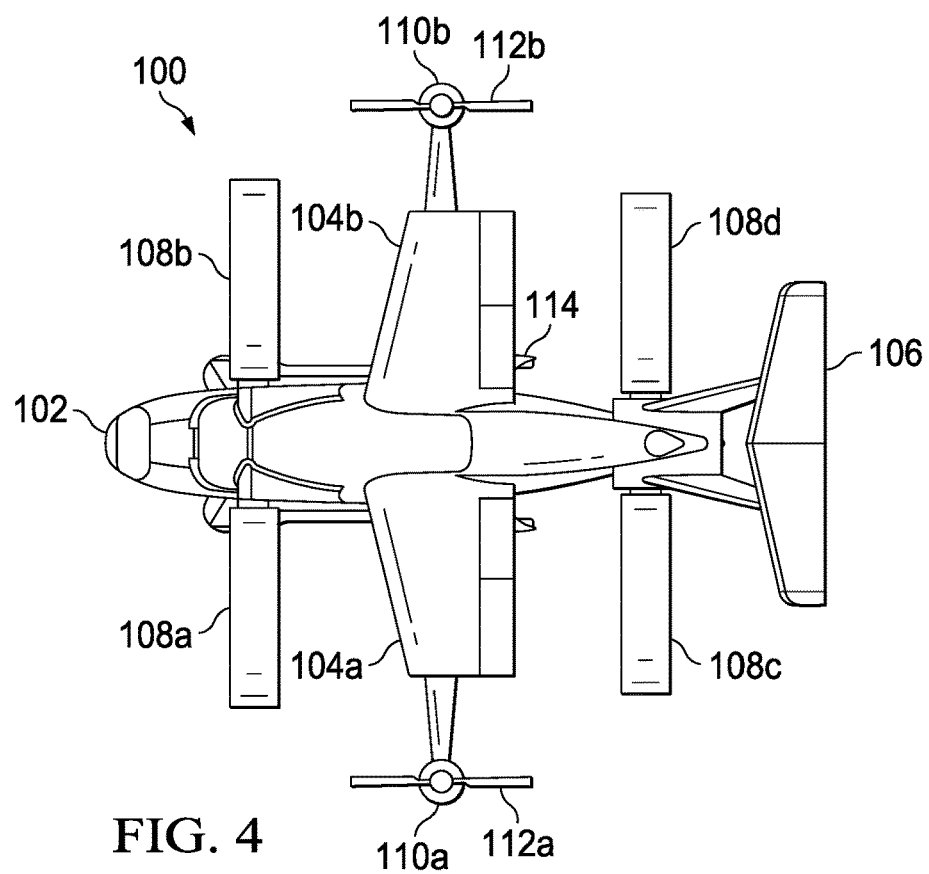
Figure 5:
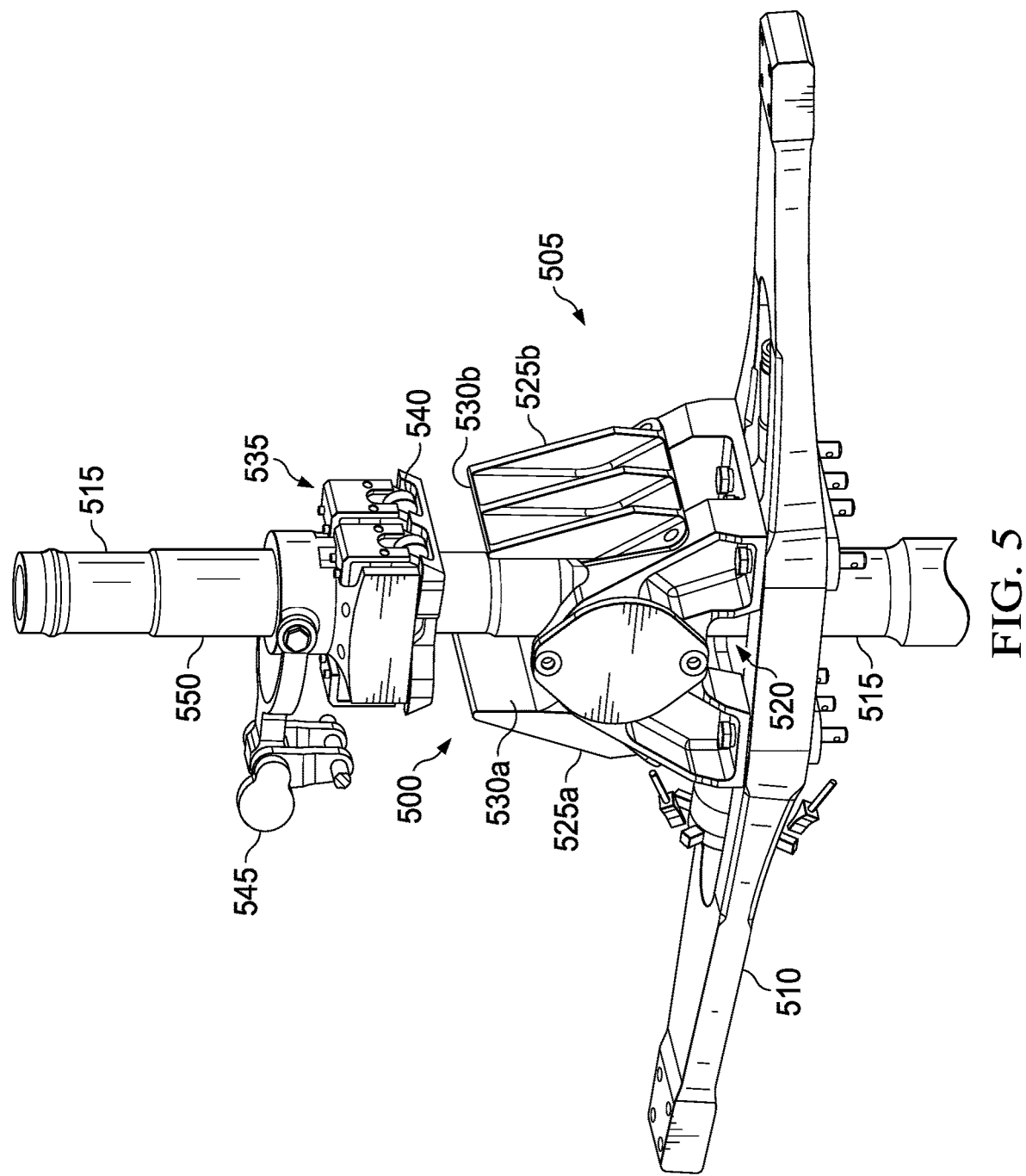
Figure 6:
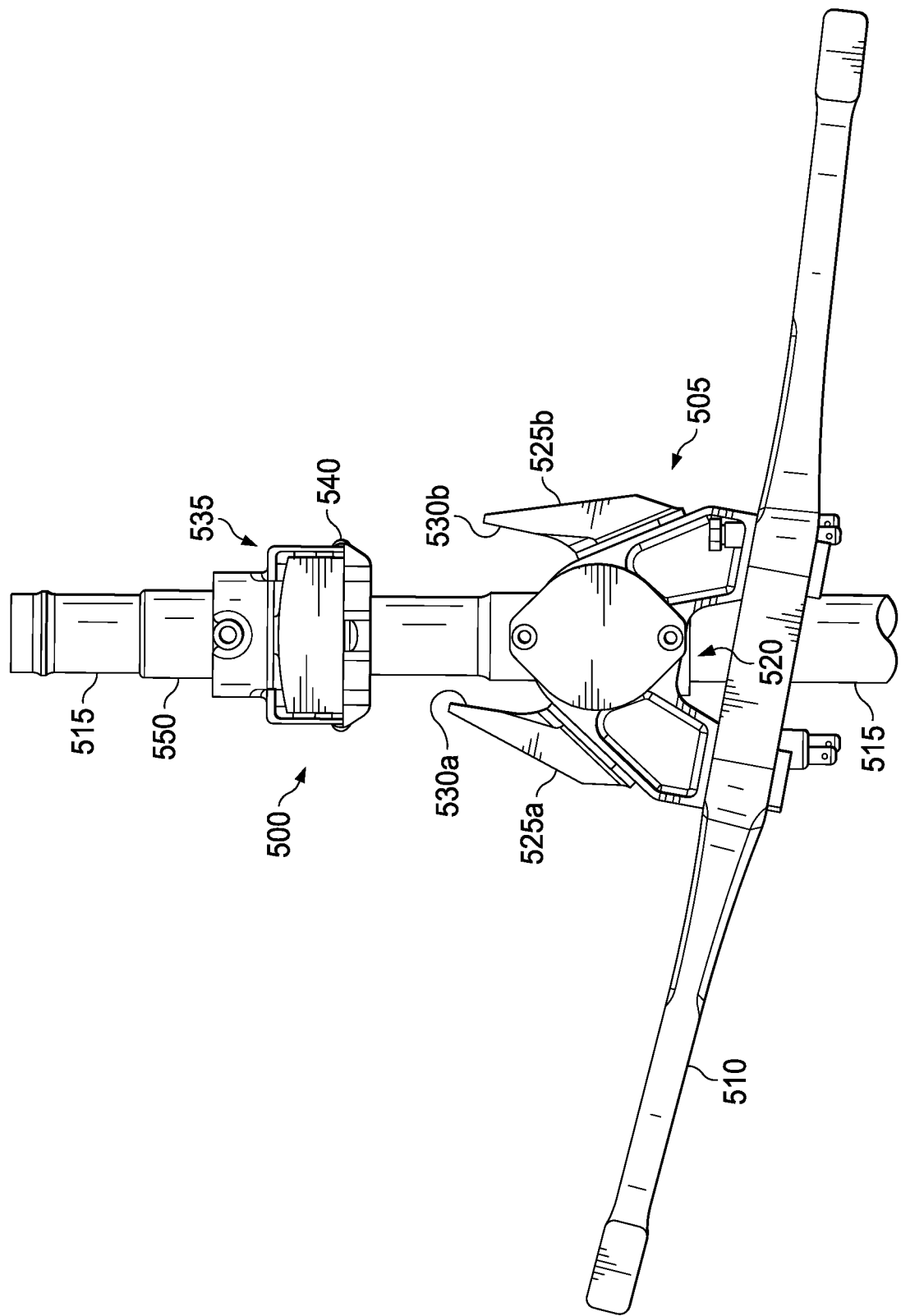
Figure 7:
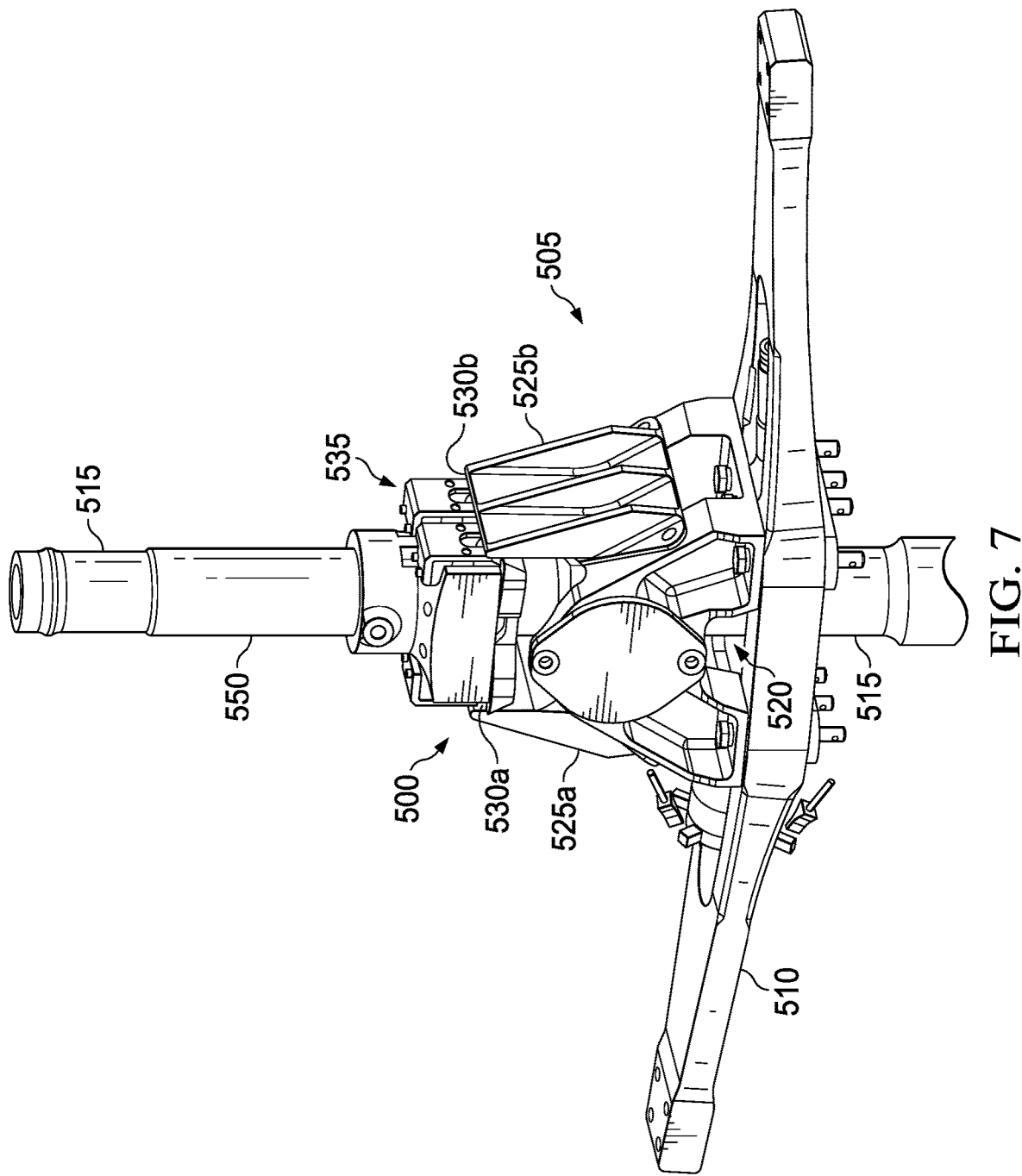
Figure 8:
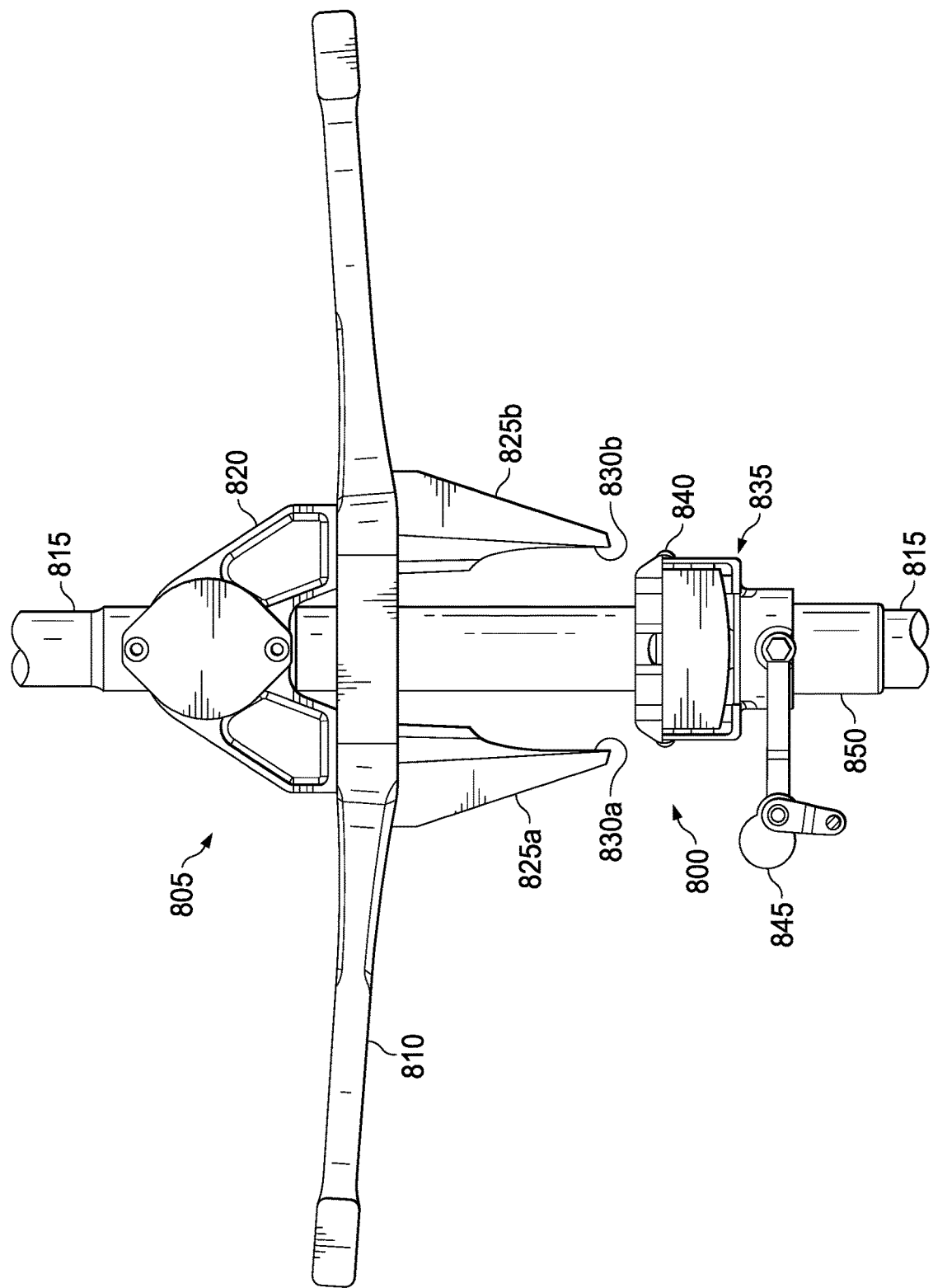
Figure 9:
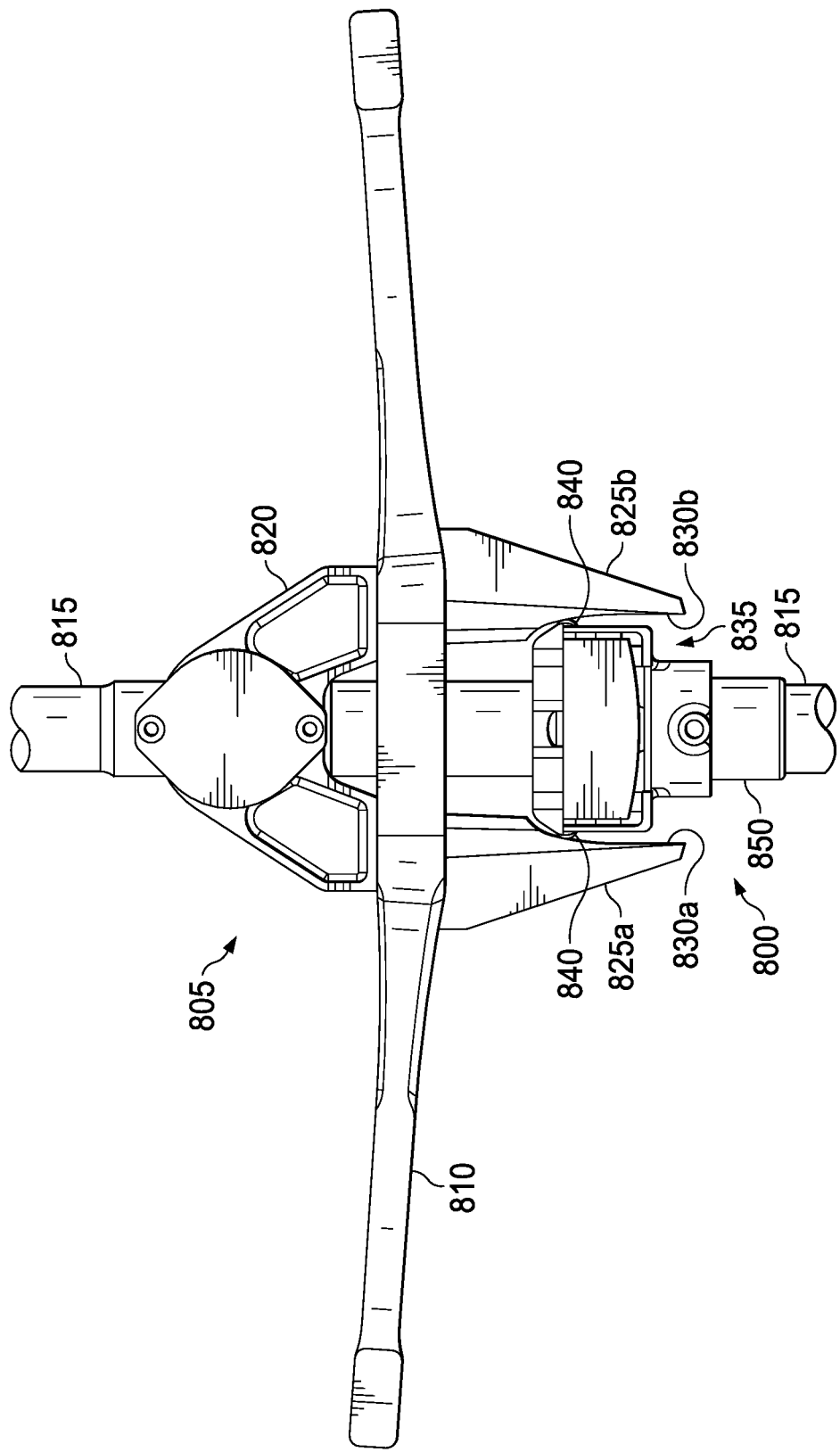
Figure 10:
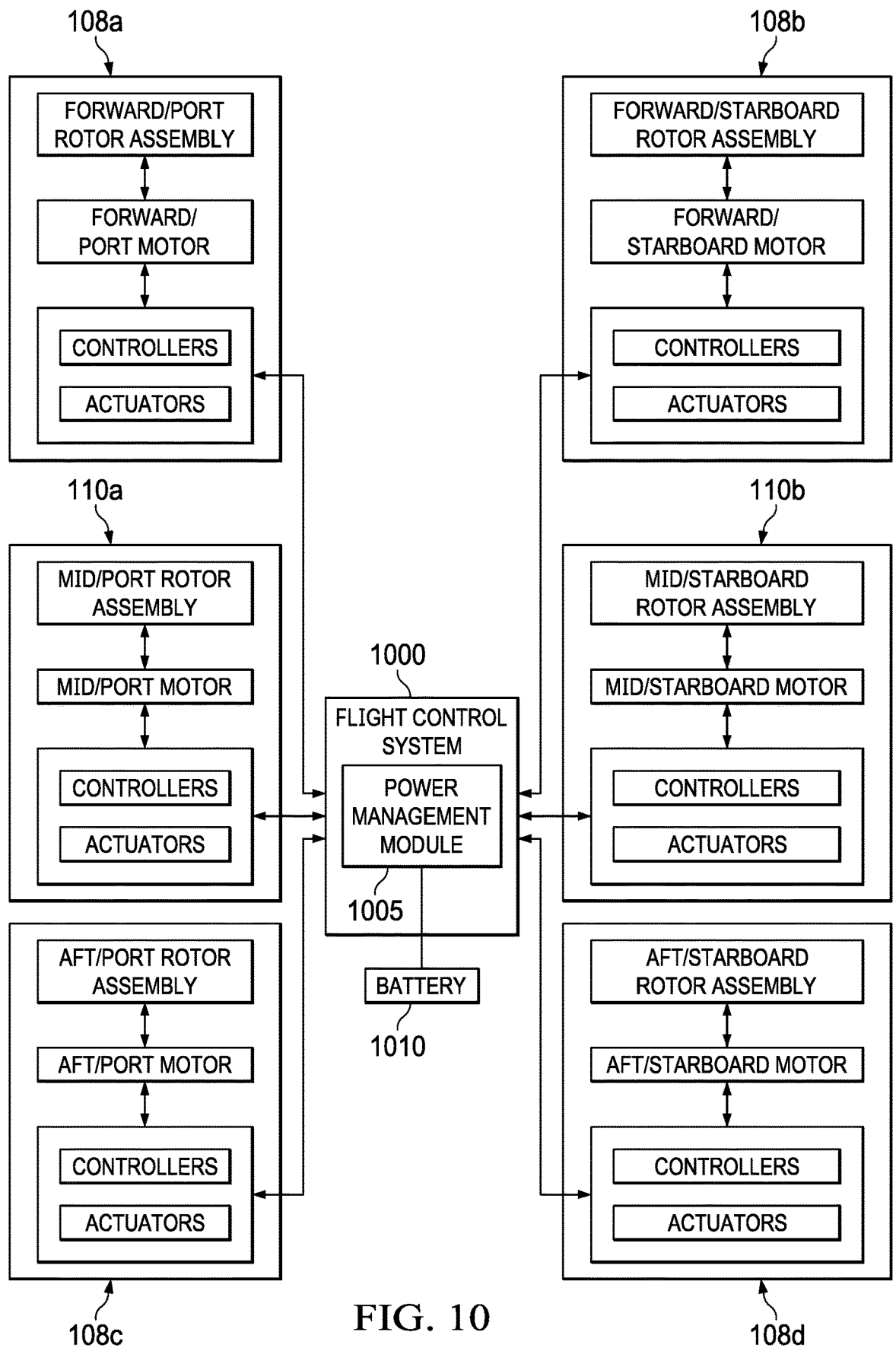
Figure 11:
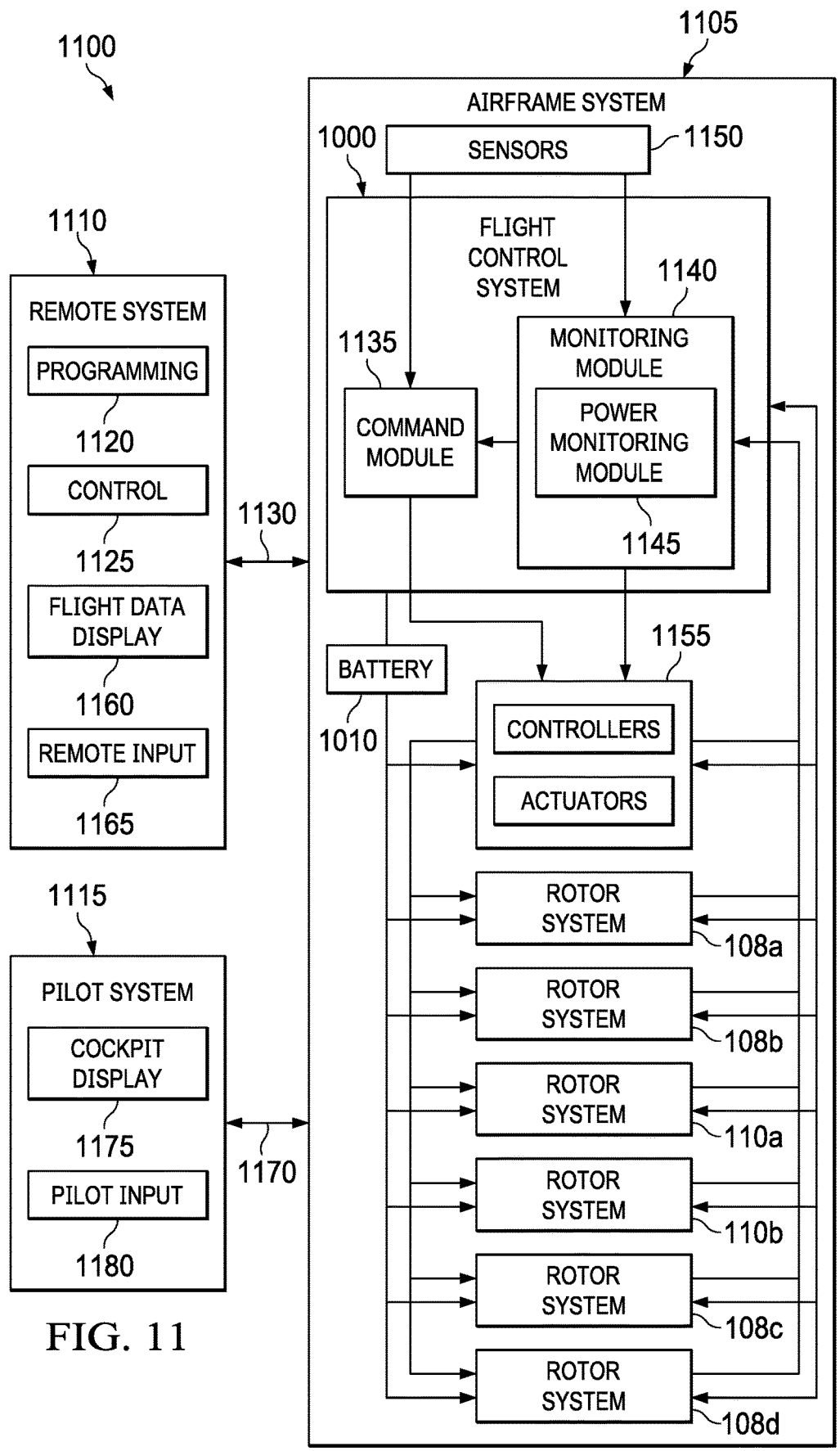

Having thus described the invention in general terms, reference will now be made to the accompanying drawings, which are not necessarily drawn to scale, and wherein:

FIG. 1 is a schematic perspective illustration of an example electric vertical takeoff and landing (eVTOL) aircraft, which may employ an embodiment of the present teeter flap lock, with the eVTOL aircraft in VTOL flight mode;

FIG. 2 is a top plan schematic illustration of the example eVTOL aircraft of FIG. 1, which may employ an embodiment of the present teeter flap lock, with the eVTOL aircraft in VTOL flight mode;

FIG. 3 is a schematic perspective illustration of the example eVTOL aircraft of FIGS. 1 and 2, with the eVTOL aircraft in forward flight mode, in which it may employ an embodiment of the present teeter flap lock;

FIG. 4 is a top plan schematic illustration of the example eVTOL aircraft of FIGS. 1 through 3, with the eVTOL aircraft in forward flight mode, in which it may employ an embodiment of the present teeter flap lock;

FIG. 5 illustrates a teeter flap lock assembly in an unlocked configuration, according to an example embodiment;

FIG. 6 illustrates the teeter flap lock assembly example embodiment of FIG. 5, in the unlocked configuration and with the rotor yoke in a flapping configuration;

FIG. 7 illustrates the teeter flap lock assembly example embodiment of FIGS. 5 and 6, in a locked configuration;

FIG. 8 illustrates an alternative example embodiment of the present teeter flap lock assembly, in an example unlocked configuration;

FIG. 9 illustrates the alternative example embodiment of the present teeter flap lock assembly of FIG. 8, in an example locked configuration;

FIG. 10 is a block diagram of eVTOL aircraft flight control, according to some embodiments; and FIG. 11 is a block diagram of flight control systems for an eVTOL aircraft, in accordance with some embodiments.

While the system of the present application is susceptible to various modifications and alternative forms, specific embodiments thereof have been shown by way of example in the drawings and are herein described in detail. It should be understood, however, that the description herein of specific embodiments is not intended to limit the system to the particular forms disclosed, but on the contrary, the intention is to cover all modifications, equivalents, and alternatives falling within the spirit and scope of the present application as defined by the appended claims. Also, any headings used herein are for organizational purposes only and are not intended to limit the scope of the description. As used herein, the word "may" is meant to convey a permissive sense (i.e., meaning "having the potential to"), rather than a mandatory sense (i.e., meaning "must"). Similarly, the words "include," "including," and "includes" mean "including, but not limited to."

DETAILED DESCRIPTION

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Embodiments of the present systems and methods generally relate to aircraft and more particularly to VTOL aircraft. Some vertical takeoff and landing (VTOL) and electric vertical takeoff and landing (eVTOL) tiltrotor configurations may employ a set of non-tilting two-bladed lift rotors that during transitioned flight (i.e., during horizontal (forward) flight) stop and line up parallel with the aircraft's fuselage for cruise, while the remaining rotors tilt from vertical take-off configuration to horizontal (forward) thrust configuration. Typical tiltrotor vertical takeoff and landing (VTOL) rotor configuration consisted of three or more blades with a gimbaled hub configuration and a lockout for the gimbaled hub. Reducing the rotors from three blades to two blades save weight and drag. For a rotor that folds up and is not utilized to generate aircraft thrust for transitioned (i.e., horizontal (forward)) flight, this represents a significant benefit. Hence, some eVTOL aircraft configurations may employ the aforementioned set of two bladed lift props that stop and line up parallel with the fuselage for cruise ((i.e., during horizontal (forward) flight). However, there is a risk that this configuration will not work well in transition flight because of hub loads and vibration from a (rigid) two-bladed rotor in edgewise flight. Typically, such two-bladed rotors are allowed to flap, or teeter, during lift (i.e., during vertical takeoff or landing operations). However, in edgewise flight stopped rotor flapping may result in unacceptable rotor oscillations and vibrations, and resulting hub loads. Embodiments of the present systems and methods provide a teeter flap lock for VTOL (or eVTOL) aircraft.

In accordance with various embodiments of the present systems and methods, a teeter flap lock may include at least one pair of diametrically positioned teeter flap lock plates extending from a rotor teetering hinge, or the like, spaced apart from a rotor mast of the aircraft. A teeter flap lock block, or the like may be positioned about the rotor mast and be configured to fit between the teeter flap lock plates and the rotor mast. The teeter flap lock block fits between and contacts the teeter flap lock plates in an engaged position, and is movable between the engaged position and a disengaged position relative to the teeter flap lock plates. The teeter flap lock enables flapping of rotors coupled to the rotor mast via the teetering hinge when the teeter flap lock block is in the disengaged position and disables flapping of the rotors when the teeter flap lock block is in the engaged position.

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

FIG. 1 is a schematic perspective illustration of example eVTOL aircraft 100, which may employ an embodiment of the present teeter flap lock. EVTOL aircraft 100 is shown in FIG. 1 in VTOL flight mode, and FIG. 2 is a top plan schematic illustration of example eVTOL aircraft 100 in VTOL flight mode. In FIGS. 1 and 2, the rotor systems of eVTOL 100 provide thrust-borne lift. VTOL flight mode includes takeoff, hover and landing phases of flight. FIG. 3 is a schematic perspective illustration of example eVTOL aircraft 100, with the eVTOL aircraft in forward flight mode, in which it may employ an embodiment of the present teeter flap lock, and FIG. 4 is a top plan schematic illustration of example eVTOL aircraft 100 in forward flight mode.

In a forward flight mode, the rotor systems provide forward thrust with the forward airspeed of eVTOL aircraft 100 providing wing-borne lift enabling eVTOL aircraft 100 to have a high speed and/or high endurance forward flight mode. In the illustrated embodiment, eVTOL aircraft 100 includes fuselage 102, wings 104a, 104b and tail assembly 106. Wings 104a, 104b have an airfoil cross-section that generates lift responsive to the forward airspeed of eVTOL aircraft 100. In the illustrated embodiment, wings 104a, 104b are straight wings with a tapered leading edge. It will be appreciated, however, that wings 104a, 104b may be of a wide variety of shapes, sizes and configurations, depending upon the performance characteristics desired. In the illustrated embodiment, wings 104a, 104b include ailerons to aid in roll and/or pitch control of eVTOL aircraft 100 during forward flight. Tail assembly 106 is depicted as having a pair of vertical stabilizers that may include one or more rudders to aid in yaw control of eVTOL aircraft 100 during forward flight. In addition, tail assembly 106 has a horizontal stabilizer that may include one or more elevators to aid in pitch control of eVTOL aircraft 100 during forward flight. It will be appreciated, however, that tail assembly 106 may be of a wide variety of shapes, sizes and configurations, depending upon the performance characteristics desired.

In the illustrated embodiment, eVTOL aircraft 100 includes six rotor systems forming a distributed thrust array. EVTOL aircraft 100 may include any number of rotor systems either greater than or less than six rotor systems. A two-dimensional distributed thrust array is provided by four of the rotor systems, including forward-port tilting rotor system 108a, forward-starboard tilting rotor system 108b, aft-port tilting rotor system 108c and an aft-starboard tilting rotor system 108d, which may be referred to collectively as tilting rotor systems 108. Forward-port tilting rotor system 108a and forward-starboard tilting rotor system 108b are each illustrated as rotatably mounted to a shoulder portion of fuselage 102 at a forward station thereof. Aft-port tilting rotor system 108c and aft-starboard tilting rotor system 108d are each shown rotatably mounted to a shoulder portion of fuselage 102 at an aft station thereof. In the illustrated embodiment, tilting rotor systems 108 are shown as ducted rotor systems each having a four bladed rotor assembly with variable pitch rotor blades operable for collective pitch control. Tilting rotor systems 108 may each include at least one variable speed electric motor and a speed controller configured to provide variable speed control to the rotor assembly over a wide range of rotor speeds, or alternatively may each include at least one constant speed electric motor to provide fixed RPM. In other embodiments, the rotor systems could be non-ducted or open rotor systems, the number of rotor blades could be either greater than or less than four and/or the rotor blades could have a fixed pitch.

When eVTOL aircraft 100 is operating in the VTOL orientation and supported by thrust-borne lift, tilting rotor systems 108 each have a generally horizontal position such that the rotor assemblies are rotating in generally the same horizontal plane, as best seen in FIGS. 1 and 2. When eVTOL aircraft 100 is operating in the forward flight orientation and supported by wing-borne lift, tilting rotor systems 108 each have a generally vertical position with the forward rotor assemblies rotating generally in a forward vertical plane and the aft rotor assemblies rotating generally in an aft vertical plane, as best seen in FIGS. 3 and 4. Transitions between the VTOL orientation and the forward flight orientation of eVTOL aircraft 100 are achieved by changing the angular positions of tilting rotor systems 108 between their generally horizontal positions, shown in FIGS. 1 and 2, and the generally vertical positions shown in FIGS. 3 and 4.

In illustrated embodiment 100, two rotor systems form a single-dimensional distributed lift thrust array, including mid-port lift rotor system 110a and mid-starboard lift rotor system 110b. These two rotor systems are, in illustrated embodiment 100, only used for lift. As discussed in greater detail below, rotors 112a and 112b of lift rotor systems 110a and 110b may be stopped, aligned generally parallel with fuselage 102, during forward flight, as shown in FIGS. 3 and 4. As illustrated mid-port lift rotor system 110a may be fixed to the outboard end of wing 104a, and mid-starboard lift rotor system 110b may be fixed to the outboard end of wing 104b. However, in various embodiments any of rotor systems 108a through 108d and/or 110a and 110b may be deployed in other locations or configurations. As but a couple of examples, lift rotors 110 may be deployed at the root of wing 104, fixed to wings 104 and/or fuselage 102, for example, at the fore-root of wing 104 or at the aft-root of wing 104. In such cases, wing 104 may have a more conventional wingtip, or the like, or may mount further tilting rotors or lift rotors at the wing ends. Lift rotor systems 110 may each include at least one variable speed electric motor and a speed controller configured to provide variable speed control to the rotor assembly over a wide range of rotor speeds, or alternatively may each include at least one constant speed electric motor to provide fixed RPM. In other embodiments, the lift rotor system rotor blades could have a fixed pitch. In the illustrated embodiment, lift rotor systems 110 are illustrated as un-ducted, two-bladed rotors, which may, in accordance with embodiments of the present systems and methods provide reduced drag when aligned generally parallel with fuselage 102, as compared to ducted rotors and/or rotors with more blades.

EVTOL aircraft 100 includes landing gear 114 for ground operations. Landing gear 114 may include passively operated pneumatic landing struts or actively operated landing struts. In the illustrated embodiment, landing gear 114 includes a plurality of wheels that enable eVTOL aircraft 100 to taxi and perform other ground maneuvers. Landing gear 114 may include a passive brake system, an active brake system such as an electromechanical braking system and/or a manual brake system to facilitate parking as required during ground operations and/or passenger ingress and egress.

As noted, during transitioned flight (i.e., during horizontal (forward) flight, FIGS. 3 and 4) this set of non-tilting two-bladed lift rotors stop and line up parallel with the aircraft's fuselage for cruise, while remaining rotors 108 tilt from vertical takeoff configuration to horizontal (forward) thrust configuration. As also noted, embodiments of the present systems and methods may employ a teeter flap lock to lockout flapping of such stopped non-tilting two-bladed lift rotors to avoid edgewise flight stopped rotor flapping which may result in unacceptable rotor oscillations and vibrations, and resulting hub loads.

FIG. 5 illustrates teeter flap lock assembly 500 for a vertical lift (i.e., non-tilting) proprotor propulsion assembly 505 (e.g., a portion of lift rotor systems 110 of FIGS. 1 through 4) in an unlocked configuration, according to an example embodiment, while FIG. 6 illustrates teeter flap lock assembly 500, still in the unlocked configuration, with rotor yoke 510 in a flapping configuration. Whereas, FIG. 7 illustrates teeter flap lock assembly 500, in a locked configuration, such as may be employed when rotors 112 of lift rotor system 110 are stopped and aligned with fuselage 102 of tiltrotor aircraft 101, or the like, for horizontal flight as shown in FIGS. 3 and 4.

Vertical lift, non-tilting prop rotor propulsion assembly 110, coupled to fuselage 102 and/or wing 104 coupled to fuselage 102, as described above, may employ propulsion assembly 505 that includes vertical lift rotor mast 515 and rotor hub teetering hinge 520. Rotor hub teetering hinge 520 is coupled to rotor mast 515 and a pair of rotor blades (not shown), such as via rotor yoke 510. Rotor hub teetering hinge 520 has a rotor teetering (i.e., a flapping (or rotational) degree of freedom relative to rotor mast 515. Mast 515 may be coupled to a transmission (not shown), such as a rotor gearbox, that is in turn coupled to an engine or motor (not shown). Engine or motor torque causes mast 515 to rotate, which in turn rotates teetering hinge 520, yoke 510 and rotor blades (not shown) attached to the yoke. Since mast 515 transmits torque from the engine or motor via teetering hinge 520 and yoke 510, rotor blades attached to the yoke are allowed to flap. Blade flapping occurs when a rotor blade is not rotating normal to the axis of mast 515. This may be accomplished with blade flapping hinge 520. Flapping primarily occurs by tilting of yoke 510 and the rotor blades follow movement of the yoke. Blade flapping occurs when an aerodynamic force is exerted on the rotor blade to move it out of a plane normal to the axis of rotation (i.e., mast 515's axis). For example, changing the pitch of the rotor blades to incur aerodynamic forces may create flapping. Additionally, maneuvering the aircraft, as well as any change in the aircraft's center of gravity may also induce flapping in the rotor system(s). Allowing flapping during VTOL operation is helpful and then when the lift-only rotor(s) is (are) not spinning, locking out that flapping in accordance with embodiments of the present systems and methods may alleviate hub load inducing rotor oscillations and vibrations, in edgewise stopped rotor flight.

In accordance with embodiments of the present systems and methods, vertical lift non-tilting prop rotor propulsion assembly 505 may employ teeter flap lock 500, which may include at least one pair of diametrically positioned teeter flap lock plates 525a, 525b extending from rotor hub teetering hinge 520, spaced apart from rotor mast 515. Teeter flap lock plates 525a and 525b may, as illustrated, be disposed with faces 530a and 530b generally parallel, facing one another, in accordance with embodiments of the present systems and methods. Teeter flap lock plates 525a and 525b may, as illustrated, be rigidly affixed to rotor hub teetering hinge 520 (pillow block(s)) or may be integral with the rotor hub teetering hinge (pillow block(s)), extending integrally therefrom.

Teeter flap lock 500 may also include teeter flap lock block 535 sliding along rotor mast 515 (i.e., positioned about the rotor mast for sliding along the rotor mast). Teeter flap lock block 535 is configured to fit between teeter flap lock plates 525a and 525b and between the flap lock plates and rotor mast 515, so as to contact teeter flap lock plates 525a and 525b (in particular, fit between and contact teeter flap lock plate faces 530a and 530b), in an engaged (i.e., locked) position, such as shown in FIG. 7. Further, teeter flap lock block 535 is movable between the engaged (i.e., locked) position shown in FIG. 7 and a disengaged (i.e., unlocked) position, as shown in FIGS. 5 and 6. When teeter flap lock block 535 is in the disengaged (i.e., unlocked) position as shown in FIGS. 5 and 6 teeter flap lock 500 (and block 535) are "disengaged" relative to teeter flap lock plates 525a and 525b. When thus disengaged, teeter flap lock 500 enables flapping of rotors coupled to rotor mast 515 via the teetering hinge 520 and rotor yoke 505, such as when the rotors are providing lift when tiltrotor aircraft 100 is in VTOL mode(s), such as shown in FIGS. 1 and 2. Conversely, teeter flap lock 500 disables flapping of the rotors when teeter flap lock block 535 is in the engaged (i.e., locked) position, as shown in FIG. 7, such as when rotors 112 are stopped and aligned with fuselage 105 of tiltrotor aircraft 100 for horizontal flight, as shown in FIGS. 3 and 4.

FIG. 8 illustrates alternative example embodiment 800 of the present teeter flap lock assembly, in another example unlocked configuration, and FIG. 9 illustrates alternative example embodiment 800 of FIG. 8, in a corresponding other example locked configuration.

In accordance with such alternative embodiments, vertical lift non-tilting prop rotor propulsion assembly 805 may employ teeter flap lock 800, which may include at least one pair of diametrically positioned teeter flap lock plates 825a, 825b extending downwardly from rotor hub teetering hinge 820, or as illustrated rotor yoke 810, spaced apart from rotor mast 815. Teeter flap lock plates 825a and 825b may, as illustrated, be disposed with faces 830a and 830b generally parallel, facing one another, in accordance with such alternative embodiments. Teeter flap lock plates 825a and 825b may, as illustrated, be rigidly affixed to rotor hub teetering hinge 820 (pillow block(s)) or may be integral with the rotor hub teetering hinge (pillow block(s)), extending integrally downwardly therefrom.

Teeter flap lock 800 may include teeter flap lock block 835 sliding along rotor mast 815 (i.e., positioned about the rotor mast for sliding along the rotor mast). Teeter flap lock block 835 is configured to fit between teeter flap lock plates 825a and 825b and between the flap lock plates and rotor mast 815, so as to contact teeter flap lock plates 825a and 825b (in particular, fit between and contact teeter flap lock plate faces 830a and 830b), in an engaged (i.e., locked) position, such as shown in FIG. 9. Further, teeter flap lock block 835 is movable between the engaged (i.e., locked) position shown in FIG. 9 and a disengaged (i.e., unlocked) position, as shown in FIG. 8. When teeter flap lock block 835 is in the disengaged (i.e., unlocked) position as shown in FIG. 8, teeter flap lock 800 (and block 835) are "disengaged" relative to teeter flap lock plates 825a and 825b. When thus disengaged, teeter flap lock 800 enables flapping of rotors coupled to rotor mast 815 via the teetering hinge 820 and rotor yoke 805, such as when the rotors are providing lift when tiltrotor aircraft 100 is in VTOL mode(s), such as shown in FIGS. 1 and 2. Conversely, teeter flap lock 800 disables flapping of the rotors when teeter flap lock block 835 is in the engaged (i.e., locked) position, as shown in FIG. 9, such as when rotors 112 are stopped and aligned with fuselage 105 of tiltrotor aircraft 100 for horizontal flight, as shown in FIGS. 3 and 4.

This alternative embodiment, where teeter flap lock block 835 comes up from beneath rotor hub teetering hinge 820 and teeter flap lock plates 825a and 825b extend downward from the teetering hinge, may enable mast 815 to be shorter (relative to mast 515, or the like). Further since eVTOL applications, especially eVTOL lift-only rotor applications, may not employ blade pitch control systems, or the like, there may be sufficient mast length free below rotor hub teetering hinge 820 to implement teeter flap lock embodiment 800 (to thereby enable use of the shorter mast).

Teeter flap lock block 535 or 835 may include a plurality of rollers 540 or 840 configured to align the teeter flap lock block and teeter flap lock plates 525*a* and 525*b* or 825*a* and 825*b* and to contact the teeter flap lock plates when the teeter flap lock block is moved to the engaged position, as shown in FIG. 7 or 9, for example, in accordance with embodiments of the present systems and methods. Teeter flap lock block rollers 540 or 840 may be spring biased away from the teeter flap lock block to contact teeter flap lock plates 525*a* and 525*b* or 825*a* and 825*b*, when the teeter flap lock block is moved to the engaged position. For example, in various embodiments, teeter flap lock block rollers 540 may be spring biased downward toward teeter flap lock plates 525*a* and 525*b* in FIG. 5, or teeter flap lock block rollers 840 may be spring biased upward toward teeter flap lock plates 825*a* and 825*b* in FIG. 8. Also, in accordance with various embodiments of the present systems and methods, the distance between teeter flap lock plates 525*a*/825*a* and 525*b*/825*b* narrows slightly, deeper into the plate cavity defined between the teeter flap lock plates, closer to the flapping hinge of teetering hinge 520 or 820 and yoke 510 or 810. Thereby, in such embodiments, as rollers 540 or 840 move closer to the flapping hinge of teetering hinge 520 or 820 and yoke 510 or 810, further into the plate cavity defined between teeter flap lock plates 525*a*/825*a* and 525*b*/825*b*, the narrowing width causes more load into the rollers, "preloading" the block into the plate cavity, forcing the block, plates, teetering hinge and yoke to act as one, locking out flapping in accordance with embodiments of the present systems and methods, so as to alleviate hub load inducing rotor oscillations and vibrations, in edgewise stopped rotor flight.

Embodiments of the present systems and methods may include an engagement mechanism 545 or 845 (in the interest of clarity, only shown only in FIGS. 5 and 8) linked to teeter flap lock block 535 or 835 and configured to slide the teeter flap lock block along rotor mast 515 or 815 to engage and disengage the teeter flap lock block from between teeter flap lock plates 525*a* and 525*b* or 825*a* and 825*b*. Engagement mechanism 545 or 845 may be driven by an actuator, or the like to slide the teeter flap lock block along rotor mast 515 or 815 to engage and disengage the teeter flap lock block from between teeter flap lock plates 525*a* and 525*b* or 825*a* and 825*b*, such as when the lift-only rotors are stopped and aligned with the aircraft fuselage for horizontal cruise flight. To facilitate such sliding along rotor mast 515 or 815 to engage and disengage the teeter flap lock, protective wear sleeve 550 or 850 may be disposed on the rotor mast between the teeter flap lock block and the mast. Protective sleeve 550 or 850 may be attached directly to the mast and the teeter flap lock block may slide up and down on the protective wear sleeve. Additionally, or alternatively teeter flap lock block 535 or 835 may include a barrier liner (not shown) disposed on a rotor mast-facing inner wall of the teeter flap lock block.

FIG. 10 is a block diagram of eVTOL aircraft flight control, according to some embodiments. EVTOL aircraft 100 may employ a fly-by-wire control system that includes flight control system 1000, deployed therein, that is preferably a redundant digital flight control system including multiple independent flight control computers. Flight control system 1000 preferably includes non-transitory computer readable storage media including a set of computer instructions executable by one or more processors for controlling the operation of eVTOL aircraft 100. Flight control system 1000 may be implemented on one or more general-purpose computers, special purpose computers or other machines with memory and processing capability. Flight control system 1000 may include one or more memory storage modules including random access memory, non-volatile memory, removable memory or other suitable memory entity. Flight control system 1000 may be a microprocessor-based system operable to execute program code in the form of machine-executable instructions. Flight control system 1000 may be connected to other computer systems via a suitable communication network that may include both wired and wireless connections.

Flight control system 1000 may communicate via a wired communications network with the electronics nodes of each rotor system 108 or 110. In some embodiments, flight control system 1000 receives sensor data from and sends flight command information to rotor systems 108 or 110 such that each rotor system 108 or 110 may be individually and independently controlled and operated. For example, flight control system 1000 may be operable to individually and independently control the rotor speed of each rotor system 108 or 110 as well as the angular position of each rotor system 108. Flight control system 1000 may autonomously control some or all aspects of flight operation for eVTOL aircraft 100. Flight control system 1000 is also operable to communicate with remote systems, such as a ground station via a wireless communications protocol. The remote system may be operable to receive flight data from and provide commands to flight control system 1000 to enable remote flight control over some or all aspects of flight operation for eVTOL aircraft 100. In addition, eVTOL aircraft 100 may be pilot operated such that a pilot interacts with a pilot interface that receives flight data from and provides commands to flight control system 1000 to enable onboard pilot control over some or all aspects of flight operation for eVTOL aircraft 100.

Flight control system 1000 may also include power management module 1005 that allocates power input for eVTOL aircraft 100 from battery 1010. Power management module 1005 determines to what extent, and in what proportion, battery 1010 provide power to the various systems of eVTOL aircraft 100.

In some embodiments, eVTOL aircraft 100 may include a liquid fuel powered generator (not shown) that includes, by way of example, a gas turbine engine and an electric generator. The electric generator may charge battery 1010 that provides power to the electric motors of rotor system(s) 108 and/or 110 via power management system 1005. This battery may include an array of batteries. In other embodiments, the generator may provide power directly to the power management system and/or the electric motors of rotor system(s) 108 and/or 110. In yet other embodiments, eVTOL aircraft 100 may rely on a battery as the onboard power source for rotor system(s) 108 and/or 110, to the exclusion of a liquid fuel powered engine, generator, or the like.

FIG. 11 is a block diagram of control system 1100 for an eVTOL aircraft, in accordance with some embodiments, such as may be operable for use with eVTOL aircraft 100 of the present disclosure. In the illustrated embodiment, control system 1100 includes three primary computer-based subsystems; namely, an airframe system 1105, a remote system 1110 and a pilot system 1115. In some implementations, remote system 1110 includes a programming application 1120 and a remote control application 1125. Programming application 1120 enables a user to provide a flight plan and mission information to eVTOL aircraft 100 such that flight control system 1000 may engage in autonomous control over eVTOL aircraft 100. For example, programming application 1120 may communicate with flight control system 1000 over a wired or wireless communication channel 1130 to provide a flight plan including, for example, a starting point, a trail of waypoints and an ending point such that flight control system 1000 may use waypoint navigation during the mission.

In the illustrated embodiment, flight control system 1000 is a computer-based system that includes a command module 1135 and a monitoring module 1140, which includes a power monitoring module 1145. It is to be understood by those skilled in the art that these and other modules executed by flight control system 1000 may be implemented in a variety of forms including hardware, software, firmware, special purpose processors and combinations thereof. Flight control system 1000 receives input from a variety of sources including internal sources such as sensors 1150, controllers and actuators 1155, rotor systems 108 or 110 and external sources such as remote system 1110 as well as global positioning system satellites or other location positioning systems and the like. During the various operating modes of eVTOL aircraft 100 including VTOL flight mode, forward flight mode and transitions therebetween, command module 1135 provides commands to controllers and actuators 1155. These commands enable independent operation of each of rotor systems 108a through 108d, 110a or 110b including rotor speed, angular position of each of rotor systems 108a through 108d, rotor stop and alignment with fuselage 102 in each of rotor systems 110a or 110b, engagement of tetter flap lock 500 or 800, or the like. Flight control system 1000 receives feedback from controllers and actuators 1155 and rotor systems 108 or 110. This feedback is processed by monitoring module 1140 that can supply correction data and other information to command module 1135 and/or controllers and actuators 1155. For example, power monitoring module 1145 may monitor the power consumption of each of rotor systems 108a through 108d, 110a and 110b and controllers and actuators 1155 so that power input from battery 1010 can be allocated. Sensors 1150, such as vibration sensors, location sensors, attitude sensors, speed sensors, environmental sensors, fuel sensors, temperature sensors and the like also provide information to flight control system 1000 to further enhance autonomous control and power allocation capabilities.

Some or all of the autonomous control capability of flight control system 1000 can be augmented or supplanted by remote flight control from, for example, remote system 1110. Remote system 1110 may include one or computing systems that may be implemented on general-purpose computers, special purpose computers or other machines with memory and processing capability. Remote system 1110 may be a microprocessor-based system operable to execute program code in the form of machine-executable instructions. In addition, remote system 1110 may be connected to other computer systems via a proprietary encrypted network, a public encrypted network, the Internet or other suitable communication network that may include both wired and wireless connections. Remote system 1110 communicates with flight control system 1000 via communication link 1130 that may include both wired and wireless connections.

While operating remote control application 1125, remote system 1110 is configured to display information relating to one or more aircraft of the present disclosure on one or more flight data display devices 1160. Remote system 1110 may also include audio output and input devices such as a microphone, speakers and/or an audio port allowing an operator to communicate with other operators, a base station and/or a pilot onboard eVTOL aircraft 100. The display device 1160 may also serve as a remote input device 1165 if a touch screen display implementation is used, however, other remote input devices, such as a keyboard or joystick, may alternatively be used to allow an operator to provide control commands to an aircraft being operated responsive to remote control.

Some or all of the autonomous and/or remote flight control of eVTOL aircraft 100 can be augmented or supplanted by onboard pilot flight control from pilot interface system 1115 that includes one or more computing systems that communicate with flight control system 1000 via one or more wired communication channels 1170. Pilot system 1115 preferably includes one or more cockpit display devices 1175 configured to display information to the pilot. Cockpit display device 1175 may be configured in any suitable form including, for example, a display panel, a dashboard display, an augmented reality display or the like. Pilot system 1115 may also include audio output and input devices such as a microphone, speakers and/or an audio port allowing an onboard pilot to communicate with, for example, air traffic control. Pilot system 1115 also includes a plurality of user interface devices 1180 to allow an onboard pilot to provide control commands to eVTOL aircraft 100 including, for example, a control panel with switches or other inputs, mechanical control devices such as steering devices or sticks as well as other control devices.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

What is claimed is:

1. A teeter flap lock for an aircraft comprising:
    at least one pair of diametrically positioned teeter flap lock plates extending from a rotor teetering hinge, spaced apart from a rotor mast of the aircraft; and
    a teeter flap lock block positioned about the rotor mast, the teeter flap lock block configured to fit between the teeter flap lock plates and the rotor mast and fit between and contact the teeter flap lock plates in an engaged position, and movable between the engaged position and a disengaged position relative to the teeter flap lock plates, the teeter flap lock enabling flapping of rotors coupled to the rotor mast via the teetering hinge when the teeter flap lock block is in the disengaged position and disabling flapping of the rotors when the teeter flap lock block is in the engaged position.

2. The teeter flap lock of claim 1, further comprising an engagement mechanism linked to the teeter flap lock block and configured to slide the teeter flap lock block along the rotor mast to engage and disengage the teeter flap lock.

3. The teeter flap lock of claim 1, further comprising a plurality of rollers on the teeter flap lock block, the rollers configured to align the teeter flap lock block and the teeter flap lock plates and contact the teeter flap lock plates, in a single axis, when the teeter flap lock block is moved to the engaged position.

4. The teeter flap lock of claim 3, wherein the rollers are spring biased.

5. The teeter flap lock of claim 1, further comprising a protective wear sleeve disposed between the teeter flap lock block and the mast.

6. The teeter flap lock of claim 1, wherein the aircraft is a tiltrotor aircraft, and the rotor mast is a fixed vertical rotor mast.

7. A propulsion assembly for an aircraft, comprising:
   a rotor mast;
   a rotor teetering hinge coupled to the rotor mast and a pair of rotor blades, the rotor teetering hinge having a rotor teetering degree of freedom relative to the rotor mast, the rotor teetering hinge comprising at least one pair of diametrically positioned teeter flap lock plates extending from the rotor teetering hinge, spaced apart from the rotor mast; and
   a teeter flap lock block positioned about the rotor mast, the teeter flap lock block configured to fit between the teeter flap lock plates and the rotor mast and fit between and contact the teeter flap lock plates in an engaged position, and movable between the engaged position and a disengaged position relative to the teeter flap lock plates, the teeter flap lock enabling flapping of the rotors when the teeter flap lock block is in the disengaged position and disabling flapping of the rotors when the teeter flap lock block is in the engaged position.

8. The propulsion assembly for an aircraft of claim 7, further comprising an engagement mechanism linked to the teeter flap lock block and configured to slide the teeter flap lock block along the rotor mast to engage and disengage the teeter flap lock.

9. The propulsion assembly for an aircraft of claim 7, further comprising a plurality of rollers on the teeter flap lock block, the rollers configured to align the teeter flap lock block and the teeter flap lock plates and contact the teeter flap lock plates, in a single axis, when the teeter flap lock block is moved to the engaged position.

10. The propulsion assembly for an aircraft of claim 9, wherein the rollers are spring biased.

11. The propulsion assembly for an aircraft of claim 7, further comprising a protective wear sleeve disposed on the rotor mast between the teeter flap lock block and the mast.

12. The propulsion assembly for an aircraft of claim 7, wherein the aircraft is a tiltrotor aircraft, the rotor mast is a fixed vertical lift rotor mast and the teeter flap lock disables flapping of the rotors when the teeter flap lock block is in the engaged position.

13. The propulsion assembly for an aircraft of claim 12, wherein the teeter flap lock is a single axis teeter flap lock, and the teeter flap lock block is only engageable to disable flapping of the rotors when the rotors driven by the rotor mast are stopped and aligned with a fuselage of the tiltrotor aircraft for horizontal flight.

14. An aircraft, comprising:
   a fuselage; and
   a plurality of rotors coupled to the fuselage, some of the rotors comprising two-bladed teetering rotors, each two-bladed teetering rotor comprising a single-axis flap lock.

15. The aircraft of claim 14, wherein the flap lock enables flapping of the two-bladed teetering rotor with the flap lock disengaged when the two-bladed teetering rotor is providing lift for vertical takeoff and/or landing.

16. The aircraft of claim 14, wherein:
   the aircraft is a tiltrotor aircraft that further comprises a wing coupled to the fuselage;
   the two-bladed teetering rotors are coupled to the fuselage and/or the wing coupled to the fuselage; and
   the flap lock enables flapping of the two-bladed teetering rotor when the flap lock is disengaged when the two-bladed teetering rotors are providing lift when the tiltrotor aircraft is in vertical takeoff and/or landing modes.

17. The aircraft of claim 16, wherein the flap lock disables flapping of the two-bladed teetering rotor when the flap lock is engaged when the two-bladed teetering rotors are stopped and aligned with a fuselage of the tiltrotor aircraft for horizontal flight.

18. The aircraft of claim 14, wherein each two-bladed teetering rotor comprises:
   a rotor mast;
   a rotor teetering hinge coupled to the rotor mast and a pair of rotor blades, the rotor teetering hinge having a rotor teetering degree of freedom relative to the rotor mast; and
   the single-axis flap lock comprising:
      at least one pair of diametrically positioned teeter flap lock plates extending from the rotor teetering hinge, spaced apart from the rotor mast of the aircraft; and
      a teeter flap lock block positioned about the rotor mast, the teeter flap lock block configured to fit between the teeter flap lock plates and the rotor mast and fit between and contact the teeter flap lock plates in an engaged position, and movable between the engaged position and a disengaged position relative to the teeter flap lock plates, the teeter flap lock enabling flapping of the rotors when the teeter flap lock block is in the disengaged position and disabling flapping of the rotors when the teeter flap lock block in the engaged position.

19. The aircraft of claim 18, wherein the teeter flap lock block further comprises a plurality of rollers the rollers configured to align the teeter flap lock block and the teeter flap lock plates and contact the teeter flap lock plates, when the teeter flap lock block is moved to the engaged position.

20. The aircraft of claim 18, further comprising an engagement mechanism linked to the teeter flap lock block and configured to slide the teeter flap lock block along the rotor mast to engage and disengage the teeter flap lock.

* * * * *